(12) United States Patent  
Wynman

(10) Patent No.: US 7,751,711 B2
(45) Date of Patent: *Jul. 6, 2010

(54) OPTICAL NETWORK TERMINAL POWER FAILURE MANAGEMENT

(75) Inventor: Stanley J. Wynman, Bogota, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 882 days.

This patent is subject to a terminal disclaimer.

(21) Appl. No.: 11/460,499

(22) Filed: Jul. 27, 2006

(65) Prior Publication Data

US 2008/0025721 A1 Jan. 31, 2008

(51) Int. Cl.
*H04J 14/00* (2006.01)
(52) U.S. Cl. ............ 398/72; 398/2; 398/7; 398/8; 398/100; 370/352; 370/389; 370/465; 725/105; 725/106; 725/127

(58) Field of Classification Search .............. 398/66, 398/67, 68, 70, 71, 72, 79, 98, 99, 100, 33, 398/38, 192, 136, 135, 91, 1, 2, 7, 8, 9, 10, 398/15, 17; 725/121, 125, 129, 127, 105, 725/106; 370/468, 352, 389, 465, 442
See application file for complete search history.

(56) References Cited

U.S. PATENT DOCUMENTS

| 7,369,771 B2 * | 5/2008 | Lee et al. ................. 398/72 |
| 2002/0063924 A1 * | 5/2002 | Kimbrough et al. ........ 359/125 |
| 2008/0240367 A1 * | 10/2008 | Wynman ................... 379/2 |

* cited by examiner

*Primary Examiner*—Hanh Phan

(57) ABSTRACT

Optical network terminal (ONT) power failure management. A system for permitting a customer of a telecommunication company, for whom fiber to the premises (FTTP) has been installed, to control operating features associated with operation of a battery backup unit (BBU) which is used, during power failure, for powering the ONT associated with the FTTP installation and the customer's telephone(s). The controlling of these features includes utilization of signal-controlled switches, which are manually over-rideable by the customer, thereby providing the desired operating feature control.

8 Claims, 3 Drawing Sheets

OPTICAL NETWORK TERMINAL POWER FAILURE MANAGEMENT

BACKGROUND OF THE INVENTION

1. Field of the Invention

The present invention generally relates to usage of a telecommunication company's fiber to the premises (FTTP) installation at customer premises and, more particularly, relates to the customer's controlling of features associated with a battery backup unit (BBU) used for powering an optical network terminal (ONT) associated with the FTTP installation during power failures.

2. Description of Prior Art

Fiber optic infrastructure is currently being deployed by certain telecommunication companies, including the assignee of the present invention, and being operatively connected to their respective customer bases. Fiber optic telecommunication infrastructure offers many advantages over the old standard copper wire cabling, not the least of which is vastly increased bandwidth. The plain old telephone system (POTS) had operated, and still operates, with copper wiring. POTS is now being made compatible with fiber optic cabling.

However, a POTS telephone system in combination with this new fiber optic infrastructure involves certain optically-related and/or other functionality not previously needed in the copper wire cabling world. For example, an optical line terminal (OLT) is needed which may be located in the central office of the relevant telecommunications company or at some other regional location (but not on customer premises). The OLT is communicatively coupled via fiber optic cable to the ONT which is normally located immediately outside of a customer's premises (typically mounted on an outside wall some four-five feet above ground).

The ONT is powered by a power supply such as, for example, a power supply similar, or related, to that described in patent application Ser. No. 11/144,566 filed Jun. 3, 2005, claiming benefit of provisional application Ser. No. 60/576,675 filed Jun. 3, 2004, its assignee, and inventor being, in common with those of this instant application entitled: "Multi-Component ONT Power Supply" and incorporated by reference herein in its entirety. That power supply is, in turn, powered by typical electric utility company power which is subject to power failure for reasons including, without limitation, natural disasters and terrorist attacks. During a utility company power failure, traditional POTS telephone service over copper wiring is ordinarily able to continue because of POTS battery back-up infrastructure which is in place at telecommunication company central offices. This battery backup system is designed to maintain POTS telephone service for an entire community. But, that otherwise-available emergency POTS telephone service shall not be available to a telephone customer using a FTTP system, if the ONT cannot communicate with the OLT over the fiber optic cable because the ONT lacks power due to that power failure.

To this end, battery backup has also been provided within the FTTP environment for the ONT and for customer telephone instruments connected to that ONT. But, in contrast with the central office location of POTS battery backup, ONT battery backup is located proximate its associated ONT, generally within, or near, the telephone customer's premises. This ONT battery backup unit (BBU) can be designed to include certain customer-useful features. One example is an alarm which sounds when the battery voltage level is low. However, an incessant sounding alarm can be an annoyance and, to compound the annoyance, the alarm is itself using battery energy when emitting sound. These features, under certain circumstances, can therefore be a detriment instead of a benefit to the customer. There is, therefore, a need for managing these features in a manner that reduces or eliminates any customer annoyance otherwise generated by these features. The present invention provides a solution to this shortcoming of the prior art.

SUMMARY OF THE INVENTION

Embodiments of the present invention include methodology and apparatus for managing an optical network terminal under conditions of a general power failure. More specifically, the present invention relates to managing certain automatic indicators of battery-backup voltage level for the optical network terminal in a manner to allow the customer a measure of control over these indicators.

In a particular embodiment, the present invention relates to a residential fiber optic communication system powered by electricity from a utility company. The system permits communication via customer premises equipment (CPE) including a telephone in a normal mode of operation. An OLT is located remotely from the customer premises, and can be located in a central office of the telephone company associated with the customer's telephone. An ONT is located at the customer premises and is in communication over a fiber optic cable with the OLT. A DC power supply is located at the customer premises for purpose of supplying electrical power to the customer's ONT and to the customer's telephone(s) via the ONT. A rechargeable battery backup unit (BBU) is located at the customer premises and is rechargeable by the power supply. The BBU is operatively coupled to the ONT and to the customer's telephone(s) via the ONT for the purpose of supplying substitute electrical power to the ONT and to the telephone(s) if and when the utility company electric power fails.

A battery output sensor and controller are located at the customer premises for monitoring output level, such as output voltage, of the battery being used for backup. The controller includes means for automatically signaling the ONT to go into a sleep mode to conserve power when the utility company electric power fails and the battery output level is reduced to a first level. The ONT includes means responsive to an off hook telephone signal for over-riding operation of the automatically signaling means and thereby reverting the sleep mode back to the normal mode of operation to permit the customer to place a call from the telephone over the system. After the call is completed, the system may automatically go back to the sleep mode.

However, during a utility company power failure where the output level has been reduced to an emergency level lower than the first level but greater than zero, the controller automatically signals the ONT to power-down completely. An emergency switch is connected between the output of the BBU and the ONT and is operable by the controller to disconnect the output of the BBU from the ONT. But, before that disconnection occurs, the ONT notifies the OLT over the fiber optic cable of the power-down signal. That disconnection stops all further power dissipation from the BBU through the ONT. However that emergency switch is also manually-operable by the customer to permit power to be re-supplied to the ONT from the BBU to allow the customer to make an emergency telephone call over the fiber optic cable. Typically, the customer would make that emergency call and then open the emergency switch To continue to conserve BBU energy or power.

In yet an additional feature of the present invention, an audio alarm provides an audible warning under conditions of a failure of electrical power from the utility company. Typically, this may occur when the BBU output voltage is at a low level approximately equivalent to the emergency mode level, although this level may fall within a range of levels running from a non-zero level below the emergency level up to the fully charged battery output level. This audible alarm battery voltage level is selected by the telecommunications company which is supplying this system. But the customer also has a measure of control. An audio alarm switch, operable by the customer, is provided which shuts-off the audio alarm for a predetermined time selectable by the customer when the BBU output level is at or below this audible alarm battery voltage level, and after which time the audio alarm automatically sounds again.

DETAILED DESCRIPTION OF THE PREFERRED EMBODIMENTS

Figure 1:
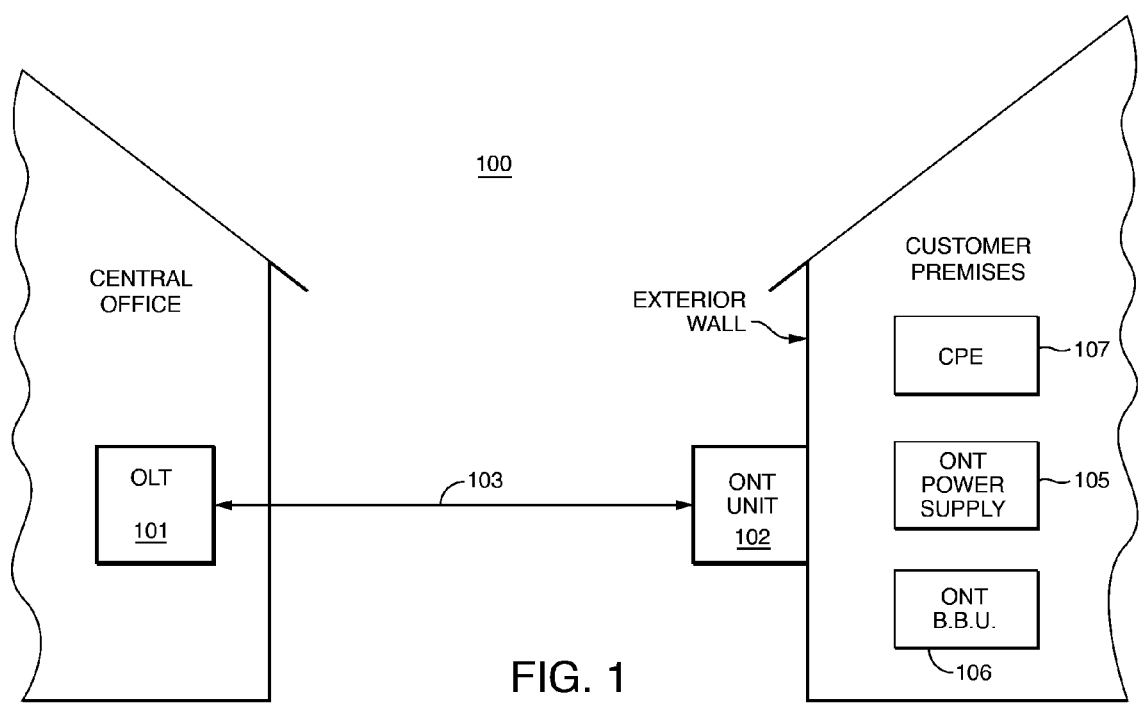
FIG. 1 depicts a FTTP communication system showing the locations of various system components consistent with principles of the present invention.

Referring to FIG. 1, fiber to the premises (FTTP) system 100 is depicted. A telecommunication company's central office is shown at the left-hand side of the drawing, housing optical line terminal (OLT) 101. Other equipment such as switches, routers, server computers, back-up batteries and other functionality (not shown) may be found in a central office.

On the right hand side of the drawing a schematic profile of a customer's premises is provided with optical network terminal (ONT) 102 which may be mounted on the exterior wall of the customer's premises as shown. A typical mounting would put ONT 102 at about four-five feet above ground. ONT 102 may be a standard fiber optical terminal which provides a suitable terminus for fiber optic cable 103. Other system components included within or at the customer premises include ONT power supply 105, BBU 106 as battery backup for ONT 102, and customer premises equipment (CPE) 107 which includes any residential-styled communication equipment such as telephones, facsimile devices, televisions, computer systems, etc. Either power supply 105 or BBU 106 or both may be physically located within the housing for ONT 102, or may be located inside the customer premises. It should be understood that electrical power is brought to the customer premises by an electrical utility company (not shown).

Signals received by OLT 101 over fiber optic cable 103 from ONT 102 may be processed in OLT 101 and may be forwarded to other equipment (not shown) located within the central office for further processing before routing those signals to their ultimate destination outside of the central office. In the opposite direction, signals to be forwarded from OLT 101 over fiber optic cable 103 to ONT 102 had previously been received by the central office from a source or sources located outside of the central office, may have been processed by the other equipment (not shown) located within the central office and may be further processed by OLT 101 before being forwarded from OLT 101 over cable 103.

Figure 2:
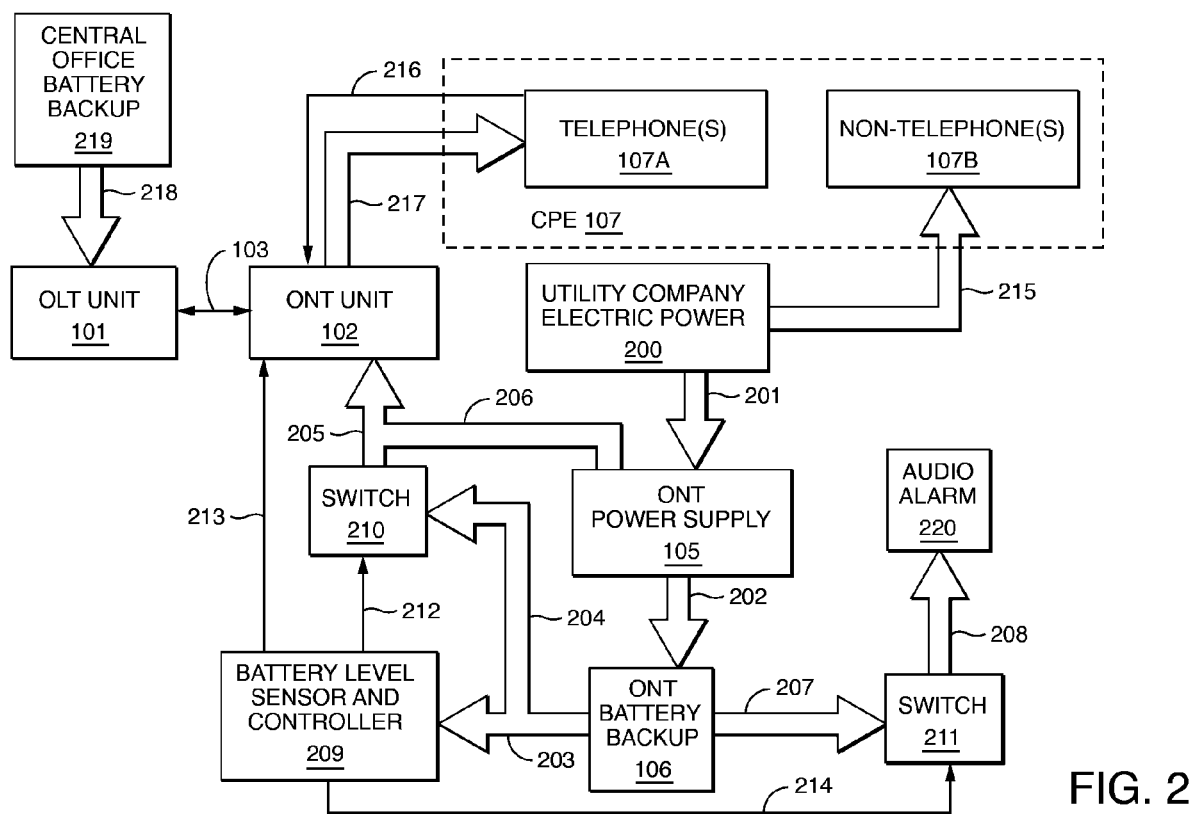
FIG. 2 is a schematic block diagram showing signal paths and power paths between various system components including those of FIG. 1 consistent with principles of the present invention.

FIG. 2 is a schematic block diagram showing signal paths and power paths between various system components, including those of FIG. 1. For clarity purposes, power paths are shown in wide-bus format and the signal paths are depicted as single line connectives. It should be understood that the thickness of the actual power cable and the thicknesses of the actual signal cables are not necessarily related to each other in the proportions shown in the drawing. Also, the spatial relationship shown in FIG. 1 may not be strictly maintained in FIG. 2. For example, the telephone company battery backup 219 in FIG. 2 is actually physically located within the telecommunication company's central office, and the utility company's electric power, shown within FIG. 2 as block 200 for clarity of illustration, is actually brought to the customer's premises in accordance with typical power distribution from a utility company.

Power Distribution:

Continuing with FIG. 2, customer premises equipment CPE 107 comprises CPE107A (exclusively telephone or telephones) and CPE 107B (all non-telephonic consumer premises equipment such as television, etc.). Starting with the utility company electric power functionality 200, it can be seen that electric power is distributed to CPE 107B on power bus 215 and to ONT power supply 105 on power bus 201. ONT power supply 105, in turn, distributes power to ONT 102 over power bus 206/205 and to BBU 106 over power bus 202. BBU 106, in turn, and only if utility company electric power 200 has failed, distributes power to ONT 102 through power bus 203/204/205 by way of emergency switch 210, and distributes power to audio alarm 220 through power bus 207/208 by way of timer switch 211.

Power output from ONT 102 is supplied to the customer's telephone(s) 107A over power bus 217. This power is derived from ONT power supply 105 if there is no power failure, and is derived from ONT BBU 106 if there is a power failure.

In the upper left of FIG. 2, other power distribution is shown as deriving from the telephone company's central office battery backup 219, and as being distributed over power bus 218 to the central offices OLT unit 101. Therefore, if there is a power failure affecting both the customer's premises as well as the telephone company's central office, telephone company battery backup 219 substitute-powers the equipment located within the central office such as OLT 101, but does not supply substitute power to ONT 102 or to CPE 107.

Signal Distribution:

Referring to battery level sensor and controller 209, (hereinafter "controller 209") at the lower left of FIG. 2, it can be seen that several signal paths emanate therefrom. Controller 209 includes functionality that senses the voltage level output of BBU 106 via power bus 203. When there has not been a power failure for some period of time, the batteries (not shown) of BBU 106 may be fully charged by power supply 105. When a power failure occurs, whereupon BBU 106 is pressed into service, output of the batteries of BBU 106 generally declines over time. This is illustrated in greater detail in FIG. 3.

Figure 3:
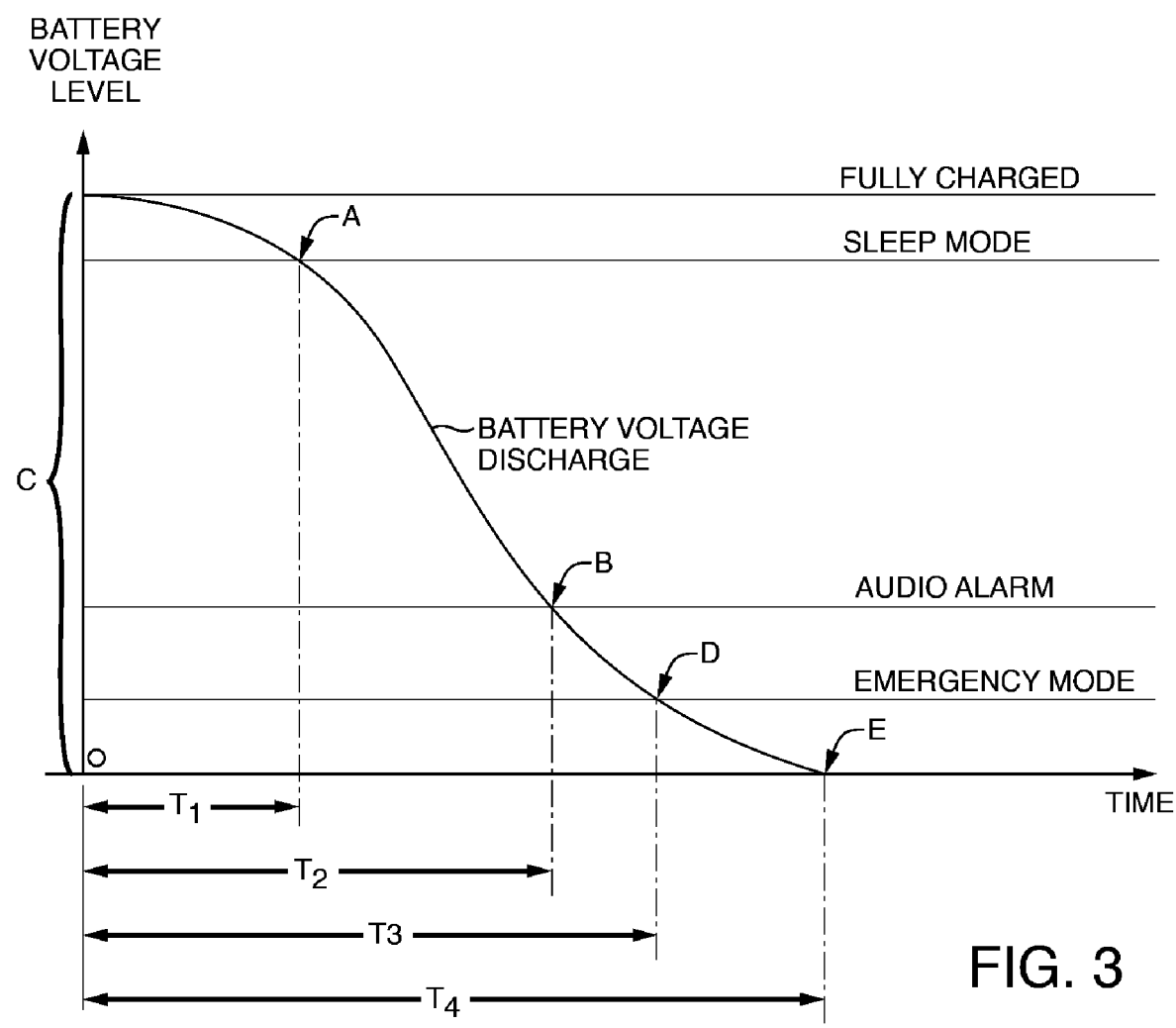
FIG. 3 is a graph of voltage versus time showing the various levels where various events may take place consistent with the principles of the present invention.

FIG. 3 is a graph of voltage output from the batteries of BBU 106 as a function of time. This discharge curve is merely exemplary, and curve depicted in FIG. 3 can assume virtually any shape having a negative or zero slope. At time zero, the batteries are fully charged, as shown. At time T1, the batteries have discharged to a point where the discharge curve intersects, at point "A", the sleep mode level, also referred to herein as level 1. This level might be, for example, approximately 75%-90% of the fully charged level, but could be virtually any percentage of the fully charged level above an emergency level, defined below.

At time T2, the battery voltage has continued to discharge to a point where the discharge curve intersects, at point "B", with the audio alarm level. The alarm level is pre-set at the telecommunications company, and it is normally intended to signal low battery voltage, but it could be used to signal something other than low battery voltage. The settable range for the audio alarm is from just above zero to just under fully charged as shown by bracket "C". If set at just above zero, it shall give an audio signal just as the batteries fail completely. If set at just under fully charged, it shall give an audio signal indicative of the onset of a power failure. This latter setting may be useful under the circumstances of a power failure during daytime where no electric lights or appliances are operating and where a customer may not otherwise have been aware of the power failure. Typically, the audio alarm level can be set to be at or near emergency mode level, with which the voltage discharge curve intersects at time T3 and at point "D."

It should be understood that the system can remain in sleep mode from point A, the level at which the sleep mode was initiated, down to point D, even though the audible alarm signifying the power outage may have sounded in the interim. Also, intermittent telephone usage may have occurred in the interim, as described below. Finally, if and when the batteries become fully discharged, at time T4, the battery voltage discharge curve intersects, at point "E", with a zero level of voltage.

Returning to FIG. 2, while also referring back to FIG. 3, when the voltage discharge curve is at point "A", at the first level (sleep mode level) of output from BBU 106, a sleep signal is sent over signal line 213 from controller 209 to ONT 102 requesting that ONT 102 enter a sleep or standby mode. In the sleep mode, multiple functions of ONT 102 are stopped to conserve power. For example, the video services could be shut down within 30 seconds, and the data services could be shut down within 15 minutes. ONT 102 remains in this sleep mode until one of two things happen: (1) electric power 200 is restored or (2) the customer lifts its telephone 107A off hook, whichever occurs first. The latter event sends a signal from telephone(s) 107A over signal line 216 to ONT 102 which, in combination with the powering of ONT 102 by battery backup 106, returns ONT 102 to a fully functional unit for purposes of allowing this particular telephone call to be made. ONT 102 and telephone 107A are both powered by BBU 106 having initial voltage output at sleep mode level. After the customer has completed that telephone call and hangs the phone back on the hook, the batteries of BBU 106 have further discharged somewhat and ONT 102 reverts to sleep mode if power 200 has not yet been restored. But, if power was restored during that telephone call, ONT 102 remains fully functional and does not revert to sleep mode. Additional calls can be made during power failure in sleep mode, provided that the voltage level output of BBU 106 remains above the emergency voltage level.

If the voltage level output of BBU 106 drops to an emergency voltage level, then ONT 102 can be automatically and completely turned off. The emergency level, shown as intersecting the voltage discharge curve at point "D" in FIG. 3, is a level that is pre-determined by the telecommunications company that supplies ONT unit 102. This emergency level provides sufficient residual energy in BBU 106 to allow, e.g., one or two more telephone calls of limited duration. Under these conditions, controller 209 provides a shut-off signal on signal line 212 to switch 210, which causes it to open. The power which had been supplied over power bus 203/204/205 to ONT 102 through switch 210 is thereby interrupted, whereby ONT 102 shuts off and cuts off power to telephone 107A. However, switch 210 is also manually operable by the customer, and if an emergency phone call must be made, that switch can be manually closed, thereby over-riding the automatic shut-down signal. There shall be sufficient energy remaining in BBU 106 to power ONT 102 and telephone 107A to allow that emergency phone call. Under these conditions, it may take a little time, perhaps ten minutes, for ONT 102 to return to operating condition before communication over the telephone actually takes place.

Referring next to audio alarm 220, it can sound only during power failure. It can be energized by BBU 106 via power buses 207/208 through switch 211 only when there is power failure. But switch 211 has to be closed to allow power to be applied to alarm 220. Switch 211 is controlled by a control signal over signal line 214 which is generated when the alarm level is triggered by the discharging battery voltage (Point B in FIG. 3). This level is set by the equipment supplier. However, that audible signal, as useful as it may be to alert the telephone customer or other members of the customer premises household of the power failure, can quickly become annoying to hear. Furthermore, the audible sound itself saps electrical energy from BBU 106 thereby making the batteries deplete more quickly than otherwise. The customer has capability of avoiding these problems.

Indeed, switch 211 is manually operable and it can be opened by the customer at any time which shall interrupt the application of electrical power via power bus 207/208 thereby cause the alarm to stop sounding if it had been on. This is an improvement provided to the customer which permits him/her to remove what might become an annoying sound not to mention saving precious battery power at the same time.

In addition, switch 211 has a controllable timing feature (not shown) associated with it. Switch 211 can be set by the customer for certain periods of time, for example one hour. If set to one hour, then if switch 211 is manually opened, it shall remain open for one hour. After that hour, it automatically closes allowing BBU power to be reapplied to alarm 220, thereby sounding the audible alarm. Thus, not only can the alarm be temporarily silenced by the customer, but the duration of the silence between alarm soundings is also under the control of the customer.

While illustrative embodiments of the present invention have been shown and described, numerous variations and alternative embodiments may occur to those skilled in the art. For example, as noted, the threshold setting of the alarm is predetermined by the equipment provider. The equipment provider could offer various models with various alarm settings if that were deemed to be a useful marketing strategy. Other variations and alternative embodiments are contemplated, and can be made without departing from the spirit and scope of the present invention as defined in the appended claims.

What is claimed is:

1. A residential fiber optic communication system powered by utility company electric power, said system permitting communication via customer premises equipment (CPE) including a telephone in a normal mode of operation, said system comprising:

an optical line terminal (OLT) located remotely from said customer premises;

an optical network terminal (ONT) located at said customer premises in communication over a fiber optic cable with said (OLT);

a DC power supply located at said customer premises for supplying DC electrical power to said ONT;

a rechargeable battery backup unit (BBU) located at said customer premises and rechargeable by said power supply, said BBU being operatively coupled to said ONT to supply substitute DC electrical power to said ONT if and when said utility company electric power fails;

a battery output sensor and controller located at said customer premises for monitoring output level of said battery;

said controller including means for automatically signaling said ONT to go into a sleep mode to conserve power when said utility company electric power fails and said output level is reduced to a first level; and said ONT including means responsive to an off hook telephone signal for over-riding operation of said automatically signaling means and thereby reverting said sleep mode back to said normal mode of operation to permit said customer to place a call from said telephone over said system.

2. The system of claim 1 wherein said controller further comprises
means for causing said system to go back to said sleep mode after said telephone call is completed.

3. The system of claim 1 wherein said controller further comprises:
means for automatically signaling said ONT to power-down completely when said utility company power fails and said output level is reduced to an emergency level, said emergency level being lower than said first level but greater than zero.

4. The system of claim 3 wherein said automatic signaling means further comprises:
an emergency switch connected between the output of said BBU and said ONT and operable by said controller;
wherein said ONT first notifies said OLT via said fiber optic cable of said power-down signaling and then powers-down completely by being disconnected from said output of said BBU by operation of said emergency switch.

5. The system of claim 4 wherein said emergency switch is manually-operable by said customer, to permit power to be re-supplied to said ONT from said BBU for purposes of allowing said customer to make an emergency telephone call from said telephone via said ONT, said fiber optic cable and said OLT.

6. The system of claim 3 further comprising:
an audio alarm to provide an audible warning under condition of a failure of electric power from said utility company; and
an audio alarm switch, operable by said customer, to shut-off the audio alarm for a predetermined time selectable by said customer.

7. The system of claim 6 wherein the audio alarm level is approximately equivalent to said emergency mode level, whereby sounding of the alarm indicates usage, or impending usage, of emergency battery energy capacity.

8. The system of claim 1 wherein said level is battery voltage level.

* * * * *